(12) United States Patent
Carr et al.

(10) Patent No.: US 10,664,361 B1
(45) Date of Patent: May 26, 2020

(54) TRANSACTIONALLY CONSISTENT BACKUP OF PARTITIONED STORAGE

(71) Applicant: Amazon Technologies, Inc., Seattle, WA (US)

(72) Inventors: Jacob Shannan Carr, Seattle, WA (US); Jesse Morgan, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/038,101

(22) Filed: Jul. 17, 2018

(51) Int. Cl.
*G06F 11/14* (2006.01)
*G06F 3/06* (2006.01)

(52) U.S. Cl.
CPC ........ *G06F 11/1469* (2013.01); *G06F 3/0644* (2013.01); *G06F 11/1471* (2013.01); *G06F 11/1474* (2013.01)

(58) Field of Classification Search
CPC ............... G06F 3/0644; G06F 11/1469; G06F 11/1471; G06F 11/1474
USPC ........................................................ 711/162
See application file for complete search history.

(56) References Cited

U.S. PATENT DOCUMENTS

| | | | |
|---|---|---|---|
| 6,578,041 B1 * | 6/2003 | Lomet ................. | G06F 11/1466 |
| 6,877,014 B1 | 4/2005 | Kasamsetty et al. | |
| 8,671,085 B2 | 3/2014 | Dhamankar et al. | |
| 8,849,871 B2 | 9/2014 | Idicula et al. | |
| 9,195,727 B2 | 11/2015 | Graefe et al. | |
| 9,672,126 B2 | 6/2017 | Dewall et al. | |
| 9,830,223 B1 * | 11/2017 | Holenstein .......... | G06F 11/1469 |
| 9,996,427 B2 | 6/2018 | Rathod et al. | |
| 2012/0173490 A1 * | 7/2012 | Gould ................. | G06F 11/1474 707/648 |
| 2012/0191664 A1 * | 7/2012 | Wakrat ................ | G06F 12/0246 707/684 |

OTHER PUBLICATIONS

Dan R.K. Ports, et al., "Transactional Consistency and Automatic Management in an Application Data Cache," Proceedings of the 9th USENIX Conference on Operating Systems Design and Implementation (OSD'10), Oct. 2010, pp. 279-292.

Andrea Cerone, et al, "A Framework for Transactional Consistency Models with Atomic Visibility," 26th International Conference on Concurrency Theory (CONCUR 2015), 2015, pp. 58-71.

* cited by examiner

*Primary Examiner* — Than Nguyen
(74) *Attorney, Agent, or Firm* — Robert C. Kowert; Kowert, Hood, Munyon, Rankin & Goetzel, P.C.

(57) ABSTRACT

Methods, systems, and computer-readable media for transactionally consistent backup of partitioned storage are disclosed. Backup operations are initiated for a first and second partition of one or more data stores. The position of a first marker is determined in a first log associated with the first partition. The first log indicates a sequence of changes for the first partition. The position of a second marker is determined in a second log associated with the second partition. The second log indicates a sequence of changes for the second partition. The first or second marker is determined to violate a transactional boundary across the first and second partitions. A position of at least one of the markers is modified such that the markers do not violate the transactional boundary.

20 Claims, 10 Drawing Sheets

TRANSACTIONALLY CONSISTENT BACKUP OF PARTITIONED STORAGE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. For example, a variety of storage services may be provided to clients. Some clients may seek to use such storage services to store transactional data, where a single transaction may include changes to different data objects.

Figure 1:
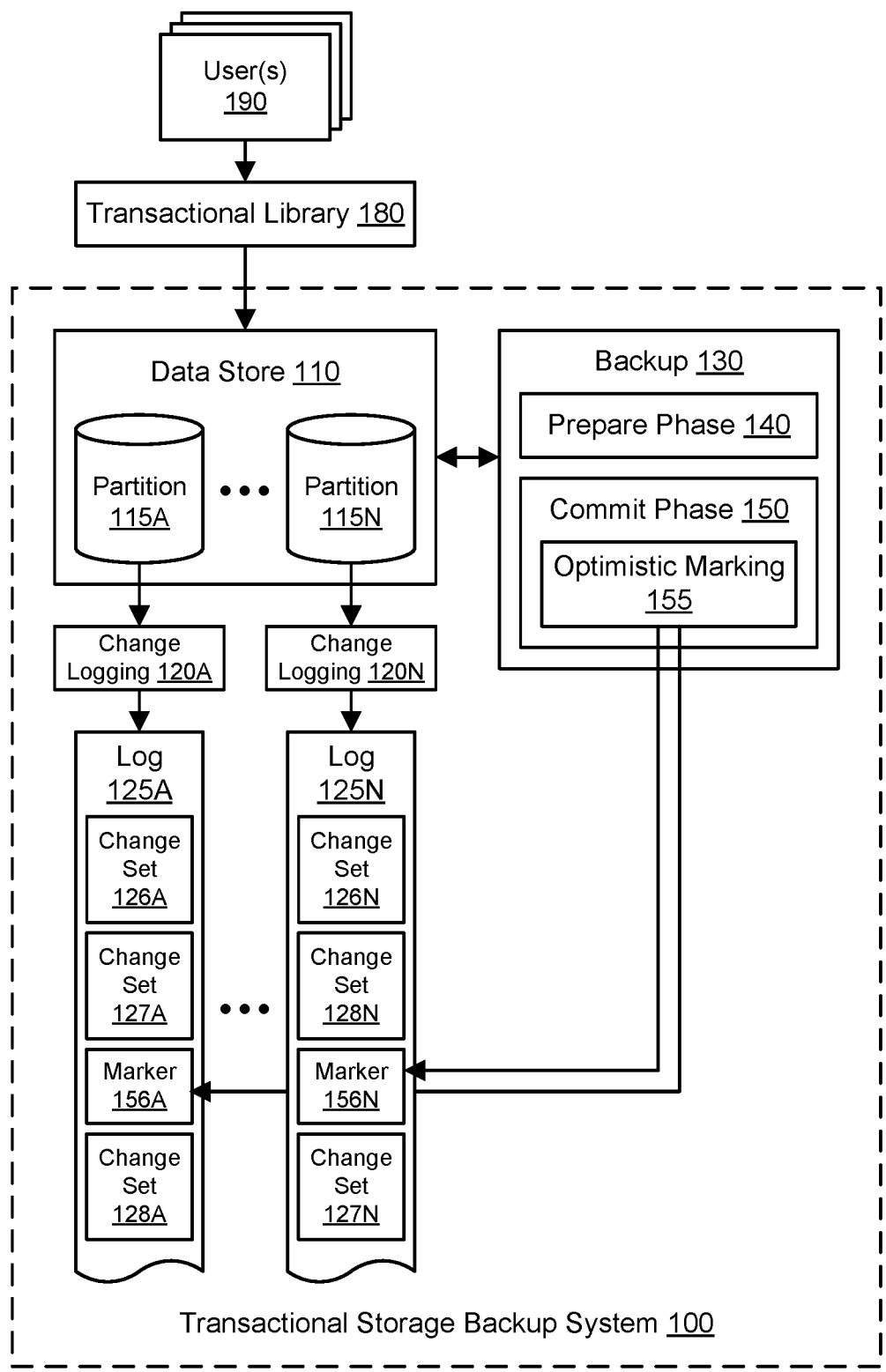
FIG. 1 illustrates an example system environment for transactionally consistent backup of partitioned storage, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for transactionally consistent backup of partitioned storage are described. Using the techniques described herein, optimistic marking of archive logs may be used to maintain transactional consistency in restored partitions of a data store. The data store may store transactional data across many partitions, e.g., such that a single transaction may result in changes to at least two partitions. When a backup is initiated for a partition, the data store may begin writing changes to a partition-specific archive log. When the backup is committed for a partition, the data store may annotate each archive log with a marker. The marker may indicate the position of the backup relative to the sequence of changes for the partition. The markers may represent an optimistic marking process that assumes that transactional boundaries have not been violated, e.g., as if a write outage were taken during the backup. However, because changes may be ordered differently in different logs, or partitions may be backed up at different times, a marker may exist before a particular transaction in one log and after the same transaction in another log. Such markers may represent a violation of transactional boundaries; if the logs were used to restore the corresponding partitions up to the position of the markers, then one restored partition may be transactionally inconsistent with another restored partition. For example, an inventory database may be inconsistent with an order processing database if the two databases are restored at different points in a sequence of transactions. At some point in time (e.g., after the backup or as part of a restore process), the logs may be analyzed to determine whether the markers do or do not violate transactional boundaries. If they do, then the markers may be moved backward or forward in the logs to a point where transactional boundaries are not violated. This repair process may examine entries in the logs within a predetermined and configurable range, e.g., in terms of number of log entries or time. Once the logs have been repaired by moving the markers, the relevant partitions may be restored in a transactionally consistent manner using the changes in the logs up to the position of the marker (and not after).

As one skilled in the art will appreciate in light of this disclosure, embodiments may be capable of achieving certain technical advantages, including some or all of the following: (1) improving the data quality of a data store by preventing broken pointers between different transactions; (2) improving the availability of a data store by providing backup of different partitions without necessarily taking a write outage to perform the backup; (3) improving the throughput and performance of a data store by optimistically marking logs during a backup and then analyzing the logs at a later point in time; (4) permitting enterprise-wide backups and restores for data sets from different divisions of the enterprise; and so on.

FIG. 1 illustrates an example system environment for transactionally consistent backup of partitioned storage, according to one embodiment. A transactional storage backup system may perform backups and restores for a data store 110. The data store 110 may use multiple partitions for storage of data. In one embodiment, for example, the data store 110 may include thousands of partitions. As shown for purposes of illustration, the data store 110 may include partition 115A through partition 115N. However, any suitable number and configuration of partitions may be used with the data store 110. In some embodiments, the partitions 115A-115N may be owned or managed by different entities, teams, or other divisions within a particular enterprise. For example, in an enterprise that operates an online marketplace, one partition or table may be associated with an order processing team while another partition or table may be associated with an inventory management team. The data store 110 may include one or more distributed hash tables (DHTs). In some embodiments, the data store 110 may represent multiple data stores that are implemented using one or more data storage subsystems or technologies. The data store 110 may maintain data objects, such as tables or databases, on behalf of users 190. Users 190 may represent or be associated with computing devices such as the example computing device 3000 shown in FIG. 7. The users 190 may represent clients of a storage service that maintains the data store 110.

In one embodiment, the users may interact with the data store 110 via a transactional library 180. The transactional library 180 may represent a library of functions associated with transactions. In various embodiments, the transactional library 180 may be implemented on the client side, on the server side, in an intermediate layer between the clients and the server, or in some combination thereof. A transaction may represent a set of operations that are performed in unison, such that the various operations may either succeed together or fail together. For example, if one data object in the data store 110 represents inventory and another data object is associated with order processing, then a single transaction for processing of an order may update the inventory and also store a record of the order for processing, thereby affecting both data objects. If any part of the transaction fails, however, then neither the inventory data object nor the order processing data object may be updated. The data objects may be stored using different partitions, e.g., partition 115A for the inventory data and partition 115N for the order data.

Using the transactional library 180, a user may cause the data store 110 to affect multiple data objects (which are often stored across multiple partitions). In one embodiment, a transaction may be associated with a batch atomic change request. A user may submit a set of proposed changes using the transactional library 180. The entire set of changes associated with a transaction may be accepted in full or rejected in full, such that the acceptance of one or more proposed changes is conditional on the acceptance of one or more other proposed changes. The transactional library 180 may offer one or more application programming interfaces (APIs) or other programmatic interfaces to users 190. In turn, the transactional library 180 may interact with the data store 110 using one or more APIs or other programmatic interfaces offered by the data store. For example, the transactional library 180 may accept a proposed atomic change request for a single transaction from a user, see whether all of the changes or none of the changes are enacted in the data store 110, and send a response (e.g., success or failure) to the user.

The data store 110 may store transactional data across different partitions, e.g., such that a single transaction may result in changes to at least two partitions. In one embodiment, a change to the data store 110 may reference an earlier change to the data store. In one embodiment, one change in a transaction may include a reference or dependency to another change in the same transaction. In one embodiment, a change in one partition may include a reference or dependency to a change in another partition. For example, an inventory data object may include a foreign key reference to the order processing data object (or vice versa). If these two data objects are not kept consistent with each other, then such a reference may be unreachable and unusable, and an error may be encountered if the reference is attempted to be followed. In particular, if an earlier version of one data object is restored to the data store 110 along with a later version of the other data object, then the reference between the two data objects may be broken, thus violating transactional consistency. For at least this reason, the transactional storage backup system 100 may attempt to maintain transactional consistency in backing up and restoring the various partitions 115A-115N of a data store 110. Transactional consistency may include all of the components or none of the components of a transaction being reflected in state of the data store 110 (often across multiple partitions) at a given time, but not only some of the components. For example, an inventory data object and an order processing data object may be involved in a particular transaction, and changes to both data objects should be present in their respective partitions at any given time. At a given time, if one of the data objects includes data associated with the transaction but another one of the data objects should but does not include data associated with the transaction, then transactional consistency has been violated. Violation of transactional consistency may leave the data store 110 in an inconsistent and erroneous state.

The system 100 may include a component 130 for performing backups. A backup may be initiated according to a predetermined schedule. A backup may be initiated by direct input from a user. A backup may be initiated in response to a request from another system or service. In various embodiments, a particular backup operation may be performed for all of the partitions 115A-115N, for a smaller subset of the partitions, or for one partition. In one embodiment, different partitions may be backed up independently and at different times. Because partitions may be backed up at different times, transactional consistency may be violated if the backups of the various partitions are restored to the data store 110. For example, if an inventory data object from an earlier time is restored along with an order processing data object from a later time, or the data objects are restored at different points relative to a sequence of transactions, then the inventory data object may include out-of-date and incorrect data. Additionally, references between the two data objects may be broken if the data objects reflect different backup times or different positions within a sequence of transactions. For at least these reasons, the transactional storage backup system 100 may use an optimistic marking process 155 during backups in a best effort approach to ensure that restored data is transactionally consistent. The backup component 130 may be tightly coupled with the transactional library 180 to ensure that backups are transactionally consistent.

In one embodiment, the system 100 may include a change logging component. The change logging components 120A through 120N may generate a stream of change data reflecting updates to the data store 110. The change data may represent additions, deletions, and other modifications. In one embodiment, the change logging may generate and update partition-specific logs. The logs may represent immutable ledgers of changes. In one embodiment, the descriptions of changes in a log may be immutable, but the log may be annotated by adding backup-related metadata as discussed below. A particular change in a log may indicate the user who requested the change, the key or row or other item that was changed, the value associated with the change, the type of change (e.g., an addition, deletion, or modification), and so on. The logs may also be referred to as archive logs or change logs. The change logging may be implemented using different instances of a change logging component, e.g., on a partition-specific basis. As shown in the example of FIG. 1, the change logging 120A may generate one log 125A representing changes in partition 115A, the change logging 120N may generate another log 125N representing changes in partition 115N, and so on. In one embodiment, the logs 125A-125N may reflect only relatively recent changes, e.g., over the last twenty-four hours. In one embodiment, one of the logs 125A-135N may reflect changes occurring since a full snapshot of the corresponding partition was taken. In one embodiment, the backup operation 130 may take a snapshot and also request the data store 110 to maintain a change log that represents additional changes beyond the snapshot. In one embodiment, the backup operation 130 may cause the data store 110 to begin issuing changes to the relevant change logs 125A-125N.

The backup operation 130 may represent a two-phase operation that includes a prepare phase 140 and a commit phase 150. In the prepare phase 140, the data store 110 and/or change logging 120A-120N may be instructed to maintain recent changes to the relevant partitions in the corresponding logs. In the prepare phase 140, the backup component may coordinate a countdown to a particular time at which the commit phase 150 is initiated. During the prepare phase 140, sets of changes may be written to the logs 125A-125N. A change set may indicate one or more changes to the corresponding partition, and multiple changes in a change set may relate to the same transaction. For example, as shown in FIG. 1, a change set 126A may be written to log 125A, while a change set 126N may be written to log 125N; the change set 126A may be related to the change set 126N, e.g., by being part of the same transaction. Similarly, a change set 127A may be written to log 125A, while a change set 127N may be written to log 125N; the change set 127A may be associated with the same transaction as the change set 127N. Additionally, a change set 128A may be written to log 125A, while a change set 128N may be written to log 125N; the change set 128A may be associated with the same transaction as the change set 128N. As shown in the example of FIG. 1, the sequence of transactions may differ between the two change logs 125A and 125N. In particular, the sequence of change sets 127A and 128A in log 125A may differ from the sequence of change sets 128N and 127N in log 125N, even though change sets 127A and 127N relate to one particular transaction while change sets 128A and 128N relate to another transaction. A particular change set in one log may be associated with a transaction ID, and one or more other change sets in one or more other logs may be associated with the same transaction ID. A particular change set in a log may also be associated with a log-specific sequential change set ID that indicates the position of the change set with respect to other change sets in the same log.

During the commit phase 150, an optimistic marking process 155 may annotate the change logs 125A-125N for the partitions that are being backed up by adding markers. In one embodiment, as shown in FIG. 1, the optimistic marking 155 may write a marker 156A to log 125A and a marker 156N to log 125N. In one embodiment, the optimistic marking 155 may determine the position of the marker 156A with respect to log 125A and the position of the marker 156N with respect to log 125N; the markers 156A-156N may be stored using metadata external to the logs 125A-125N, e.g., where the metadata indicates the position of the marker relative to the sequential change set IDs of one or more log entries. A marker may also be referred to as a checkpoint. A marker may represent a position of the backup operation relative to a sequence of changes in the log. As shown in FIG. 1, the marker 156A may be positioned after the change set 127A but before the change set 128A, e.g., if the change set 128A is not received by the change logging component 120A-120N until after the position of the marker 156A has been determined in the commit phase 150. As also shown in FIG. 1, the marker 156N may be positioned after the change set 128N but before the change set 127N, e.g., if the change set 127N is received out of order by the change logging component 120A-120N and not until after the position of the marker 156N has been determined in the commit phase 150.

The markers may represent an optimistic approach that transactional consistency has not been violated in the backup of multiple partitions. The optimistic markers 156A-156N may be positioned as if a write outage had been taken during the backup operation 130. However, as shown in the example of FIG. 1, the positions of the markers in the two logs 125A and 125N may indeed violate transactional consistency with respect to a first transaction associated with change sets 127A and 127N and/or with respect to a second transaction associated with change sets 128A and 128N. The markers may violate transactional consistency because, if the log 125A were used to restore the partition 115A up to the position of marker 156A in the sequence of changes, and the log 125N were used to restore the partition 115N up to the position of marker 156N in the sequence of changes, then the data store 110 would reflect only a portion of the first transaction and only a portion of the second transaction. Because a given transaction is an all-or-nothing entity, such transactional inconsistency in the data store 110 may result in erroneous data, broken references, and other problems. For at least this reason, the system 100 may implement a log repair component to move the markers to a different position, as discussed in further detail below.

Figure 7:
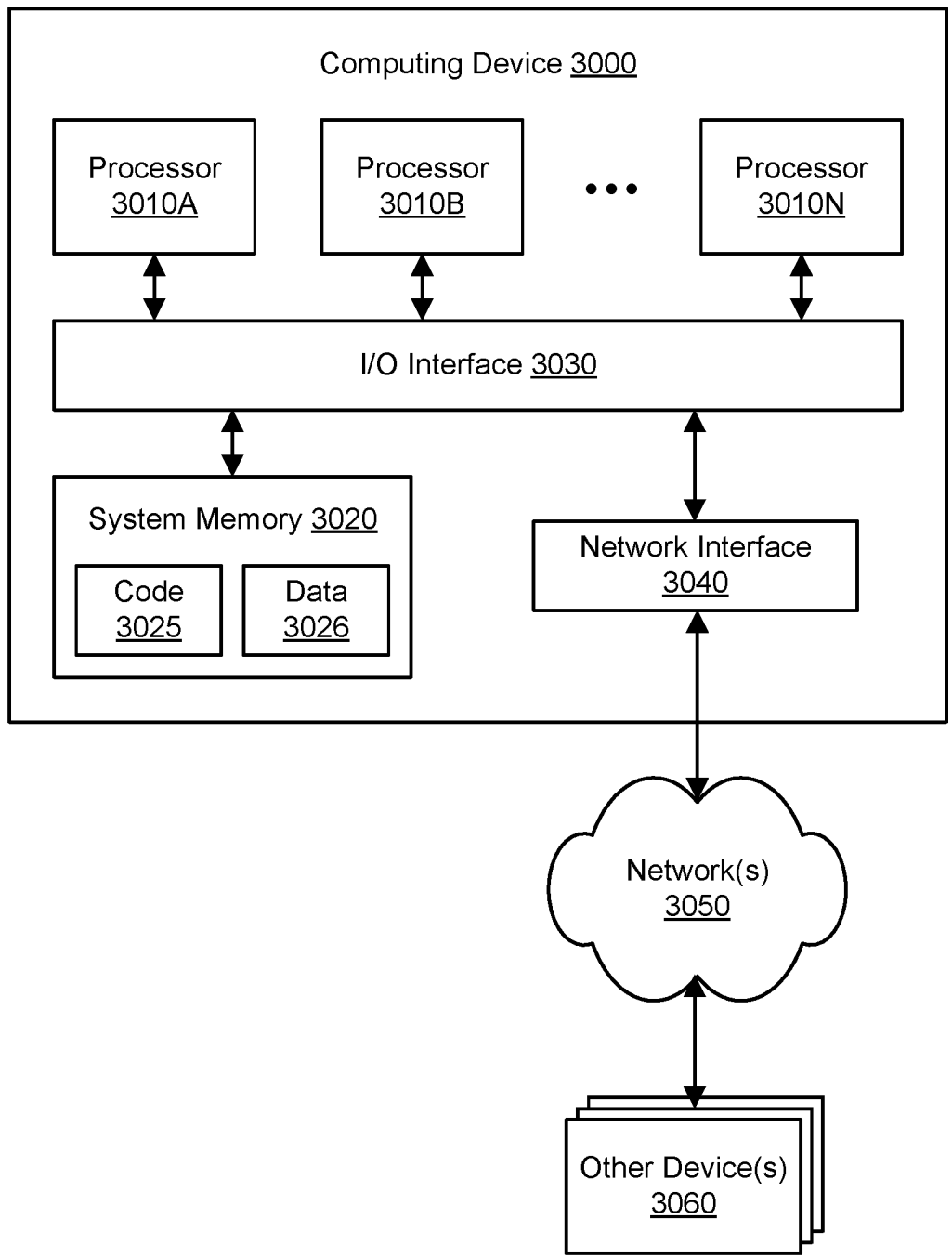
FIG. 7 illustrates an example computing device that may be used in some embodiments.

The system 100 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

The data store 110, change logging functionality 120A-120N, and/or backup functionality 130 may be implemented in a service-oriented system in which multiple services (e.g., services in the execution environments 140A-140N) collaborate according to a service-oriented architecture. In such an environment, the data store 110, change logging functionality 120A-120N, and/or backup functionality 130 may offer their functionality as a service to multiple clients. To enable clients to invoke their functionality, the data store 110, change logging functionality 120A-120N, and/or backup functionality 130 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the data store 110, change logging functionality 120A-120N, and/or backup functionality 130 may be offered to clients in exchange for fees, or the cost associated with operating the data store 110, change logging functionality 120A-120N, and/or backup functionality 130 may be assessed to a responsible entity.

Components of the system 100 and the users 190 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100, such as the data store 110, may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2A:
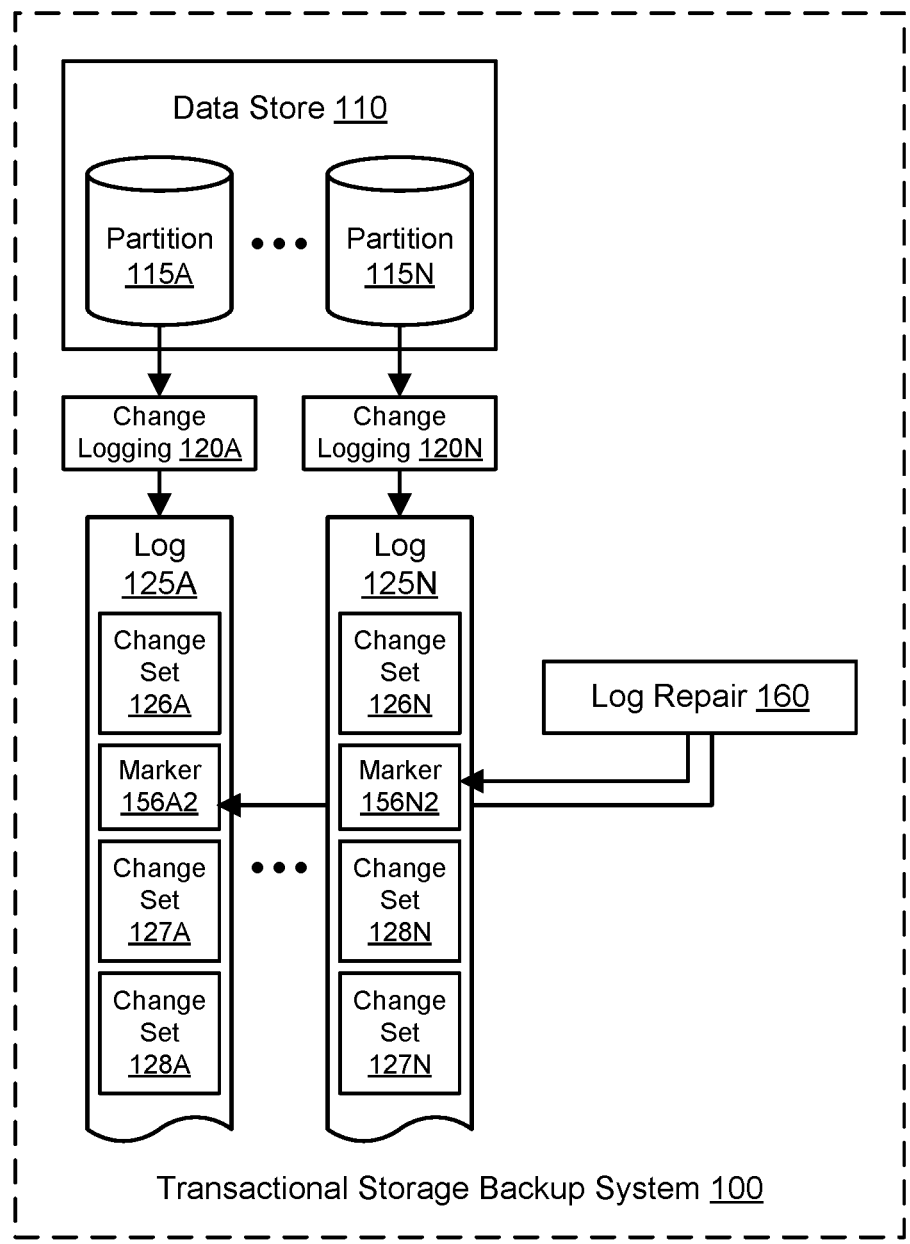
FIG. 2A and FIG. 2B illustrates further aspects of the example system environment for transactionally consistent backup of partitioned storage, including examples of log repair for archive logs with markers that violated a transactional boundary, according to one embodiment.
Figure 2B:
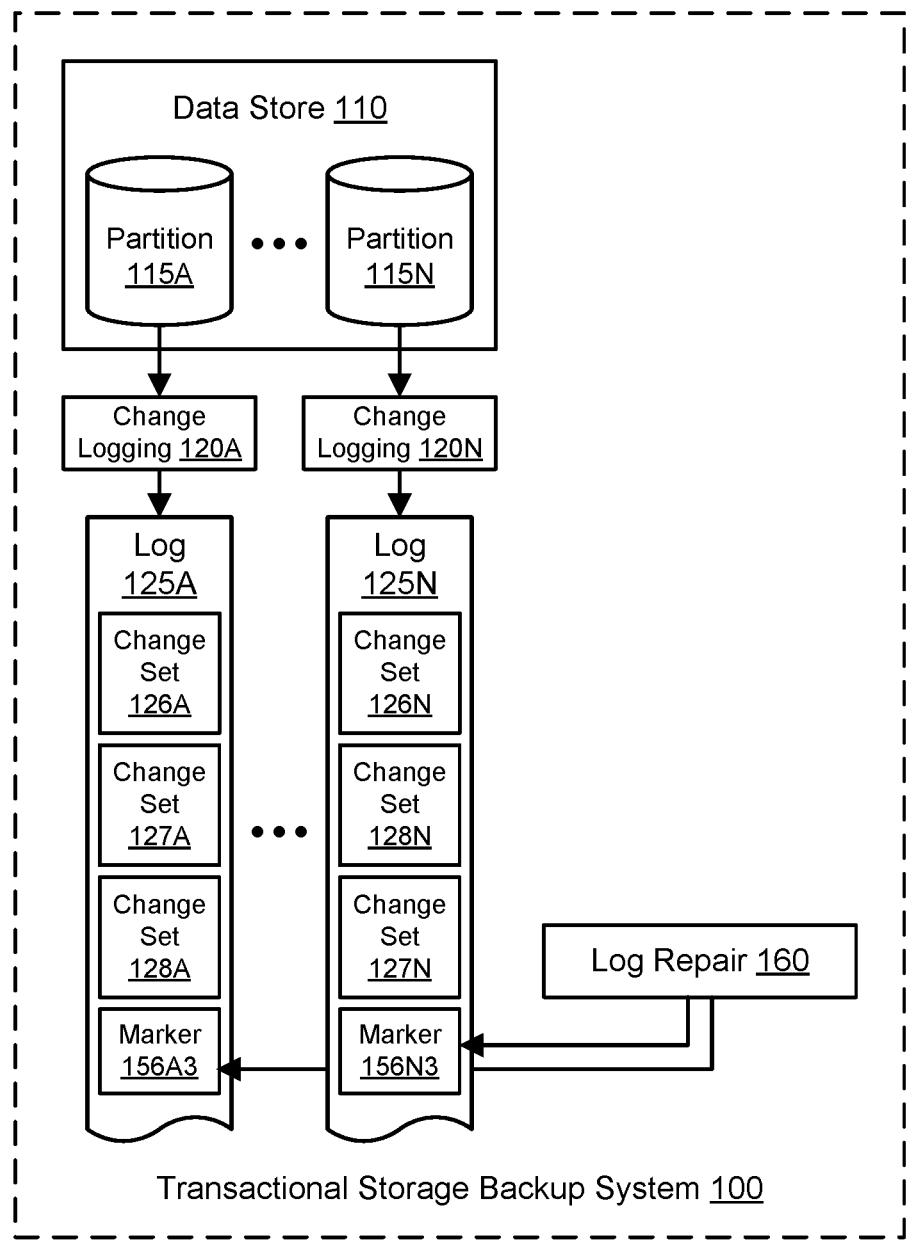

FIG. 2A and FIG. 2B illustrates further aspects of the example system environment for transactionally consistent backup of partitioned storage, including examples of log repair for archive logs with markers that violated a transactional boundary, according to one embodiment. In one embodiment, the system 100 may include a component for log repair 160 that addresses the violation of transactional consistency in the logs. The log repair 160 may be performed at any suitable time and potentially on an as-needed basis to make efficient use of resources (e.g., computing resources, storage resources, network resources, and so on). In one embodiment, the log repair 160 may be performed during or shortly after the backup process 130. In one embodiment, the log repair 160 may be performed at a later time, e.g., while resource availability is high. In one embodiment, the log repair 160 may be performed at the beginning of a restore process to ensure that the data store 110 is restored to a transactionally consistent state.

The log repair component 160 may inspect a set of two or more change logs (e.g., log 125A and 125N) to determine whether the positions of the markers violates a transactional boundary. As discussed above with respect to FIG. 1, the positions of the markers in the two logs 125A and 125N may indeed violate transactional consistency with respect to a first transaction associated with change sets 127A and 127N and/or with respect to a second transaction associated with change sets 128A and 128N. As discussed above, a particular change set (such as change set 126A) in log 125A may be associated with a transaction ID, and another change set (such as change set 126N) in log 125N may be associated with the same transaction ID. The transaction IDs across different logs 125A-125N may be analyzed using the log repair component 160 to determine whether transactional consistency is violated by the position of one or more markers in the logs. In one embodiment, the log repair component 160 may look backward in the sequence of changes in a log to attempt to find a new position for a marker at which transactional consistency is not violated. In one embodiment, the log repair component 160 may look forward in the sequence of changes in a log to attempt to find a new position for a marker at which transactional consistency is not violated. In one embodiment, the backward or forward search may be performed within a predetermined boundary or constraint. For example, the search may look at the N change sets before or after the current marker to find a new position for the marker. As another example, the search may look change sets within a particular period of time (before or after the current marker) to find a new position for the marker. Such constraints may be configurable by a user. A search constraint may be determined based (at least in part) on a user-supplied budget.

In one embodiment, a marker may be moved in only one log to restore transactional consistency. In one embodiment, markers may be moved in multiple logs to restore transactional consistency. As shown in the example of FIG. 2A, a marker may be moved to a new position earlier in the sequence of changes. For example, the log repair 160 may remove the original marker 156A (between change sets 127A and 128A) and replace it with a new marker 156A2 (between change sets 126A and 127A). The log repair 160 may also remove the original marker 156N (between change sets 128N and 127N) and replace it with a new marker 156N2 (between change sets 126N and 128N). In the illustrated example, the new markers do not break up any cross-partition transactions (e.g., the transaction represented by change sets 127A and 127N or the transaction represented by change sets 128A and 128N). In one embodiment, moving a marker may include removing metadata in the log representing the new marker and adding metadata to the log representing the new marker. In one embodiment, moving a marker may include modifying marker metadata external to the logs 125A-125N. By moving both markers to the new positions as shown in FIG. 2A, the log repair component 160 may ensure that a restore process that replays changes up to the markers does not leave the corresponding partitions in a transactionally inconsistent state.

As shown in the example of FIG. 2B, a marker may be moved to a new position later in the sequence of changes. For example, the log repair 160 may remove the original marker 156A (between change sets 127A and 128A) and replace it with a new marker 156A3 (positioned after change set 128A). The log repair 160 may also remove the original marker 156N (between change sets 128N and 127N) and replace it with a new marker 156N3 (positioned after change set 127N). In the illustrated example, all the components of the transaction represented by change sets 127A and 127N are represented before the new markers. Similarly, all the components of the transaction represented by change sets 128A and 128N are represented before the new markers. By moving both markers to the new positions as shown in FIG. 2B, the log repair component 160 may ensure that a restore process that replays changes up to the markers does not leave the corresponding partitions in a transactionally inconsistent state. The decision to move the markers back (as shown in FIG. 2A) or forward (as shown in FIG. 2B) may be based on a customer-supplied budget, on whether the logs represent undo logs (in which markers can be moved back or forward) or redo logs (in which markers can be moved forward but not back), and/or on any other suitable basis.

Figure 3:
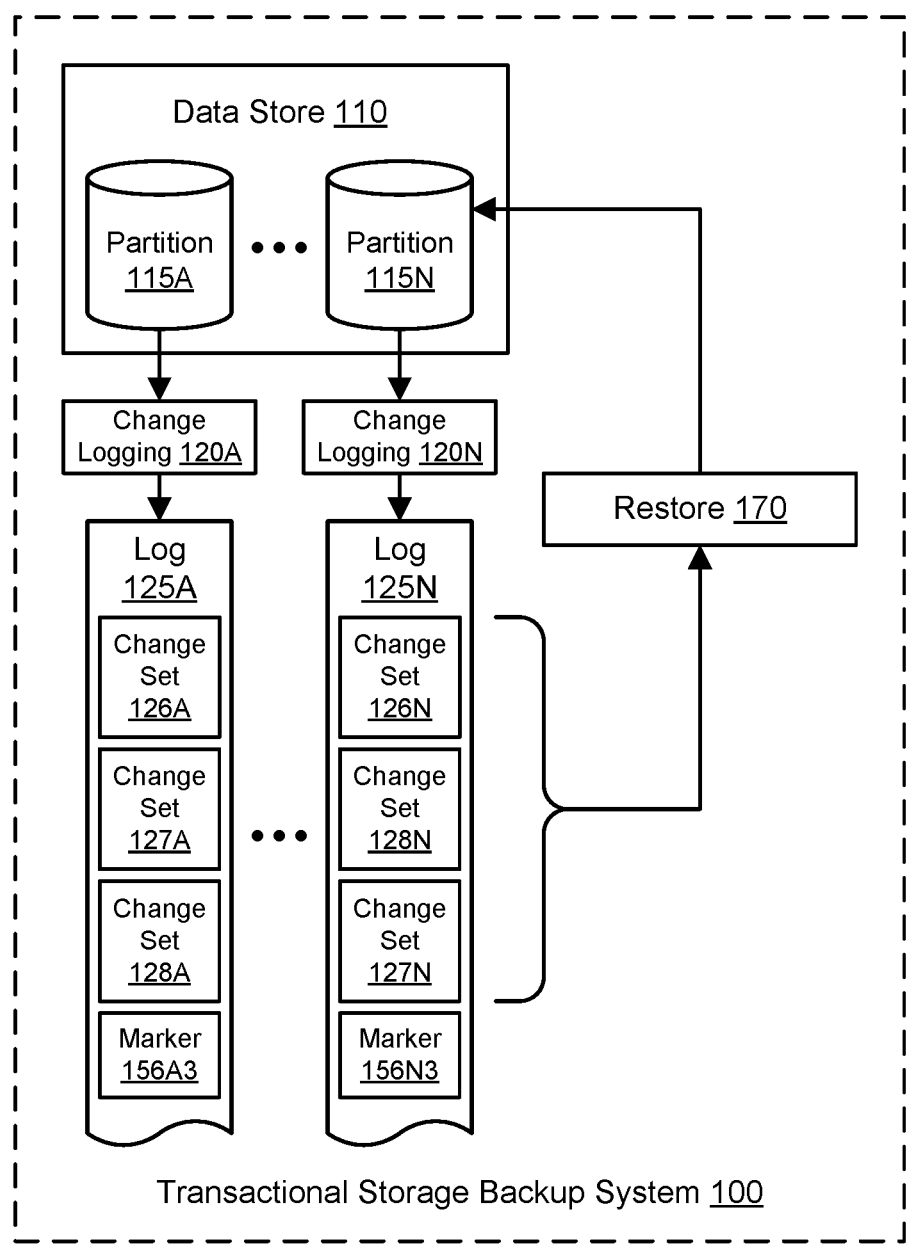
FIG. 3 illustrates further aspects of the example system environment for transactionally consistent backup of partitioned storage, including a restore operation using archive logs that were repaired to observe transactional boundaries, according to one embodiment.

FIG. 3 illustrates further aspects of the example system environment for transactionally consistent backup of partitioned storage, including a restore operation using archive logs that were repaired to observe transactional boundaries, according to one embodiment. In one embodiment, the system 100 may include a restore operation 170 that restores one or more partitions of the data store 110 to a transactionally consistent state. The restore operation 170 may use the sequence of changes in a particular log to restore the corresponding partition to the state immediately prior to the position of the log's marker in the sequence of changes. In one embodiment, the restore operation 170 may apply the changes in the log after loading a full snapshot of the corresponding partition. As shown in the example of FIG. 3, the restore operation 170 may restore partition 115N using change sets 126N, 128N, and 127N up to the position of marker 156N3. Similarly, the restore operation 170 may restore partition 115A using change sets 126A, 127A, and 128A up to the position of marker 156A3. By using repaired logs that observe transactional boundaries, the restore operation 170 may restores partitions 115A and 115N of the data store 110 to a transactionally consistent state.

Figure 4A:
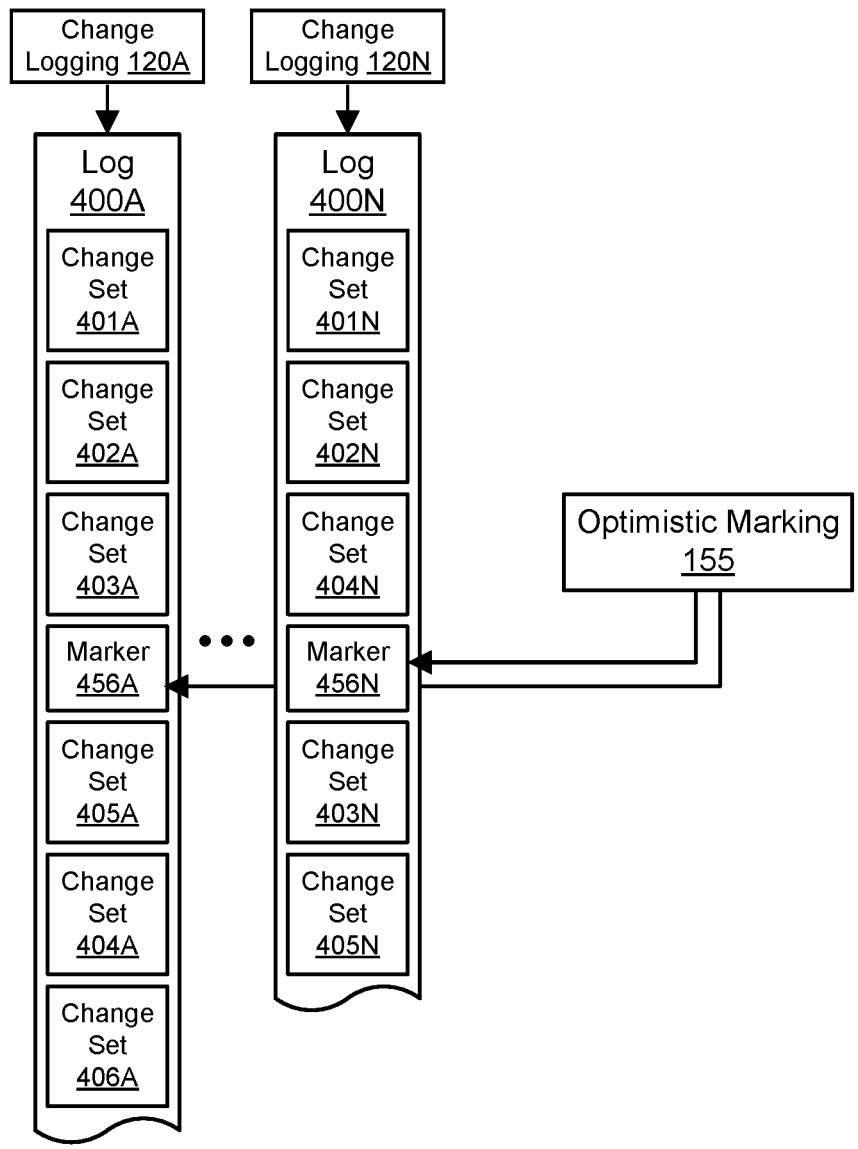
FIG. 4A, FIG. 4B, and FIG. 4C illustrate examples of moving markers to repair archive logs that violated a transactional boundary, according to one embodiment.
Figure 4B:
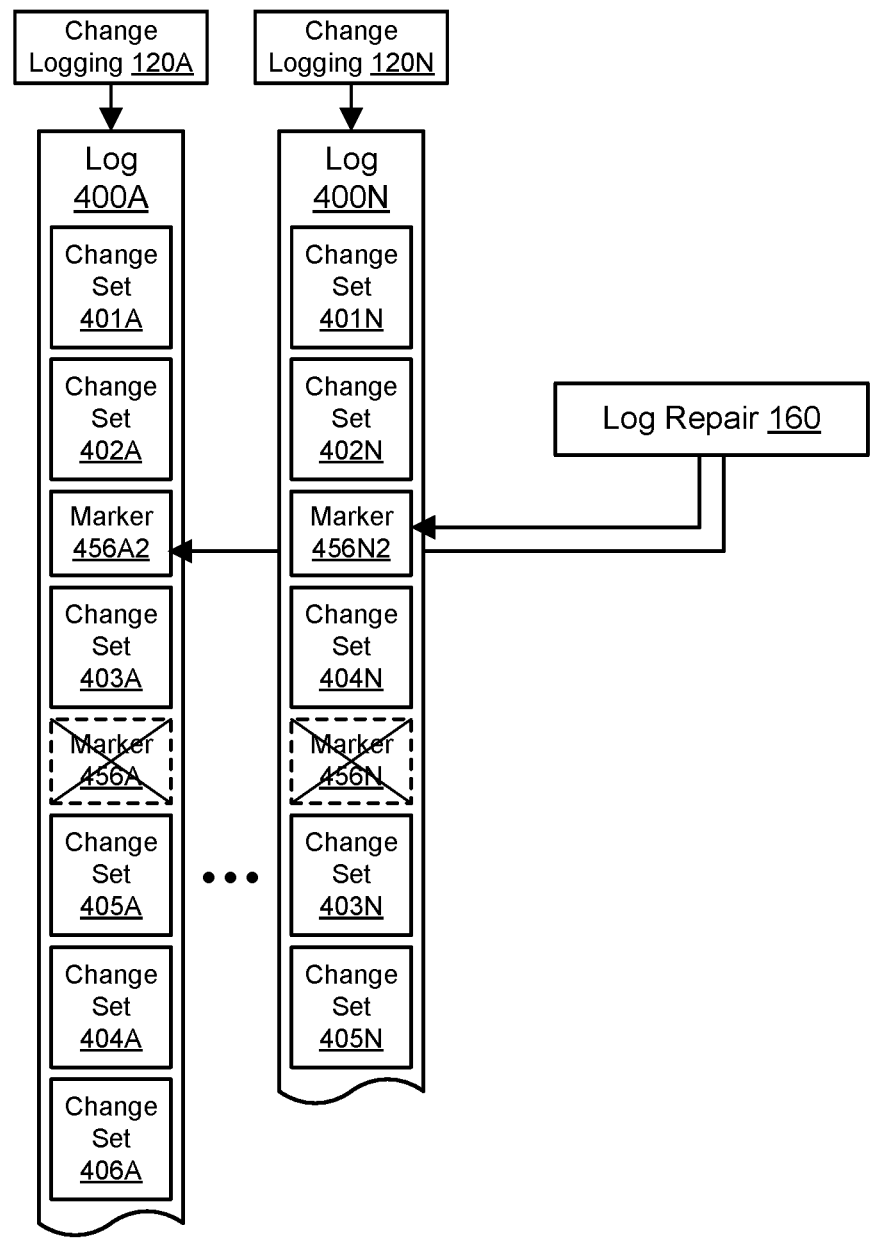
Figure 4C:
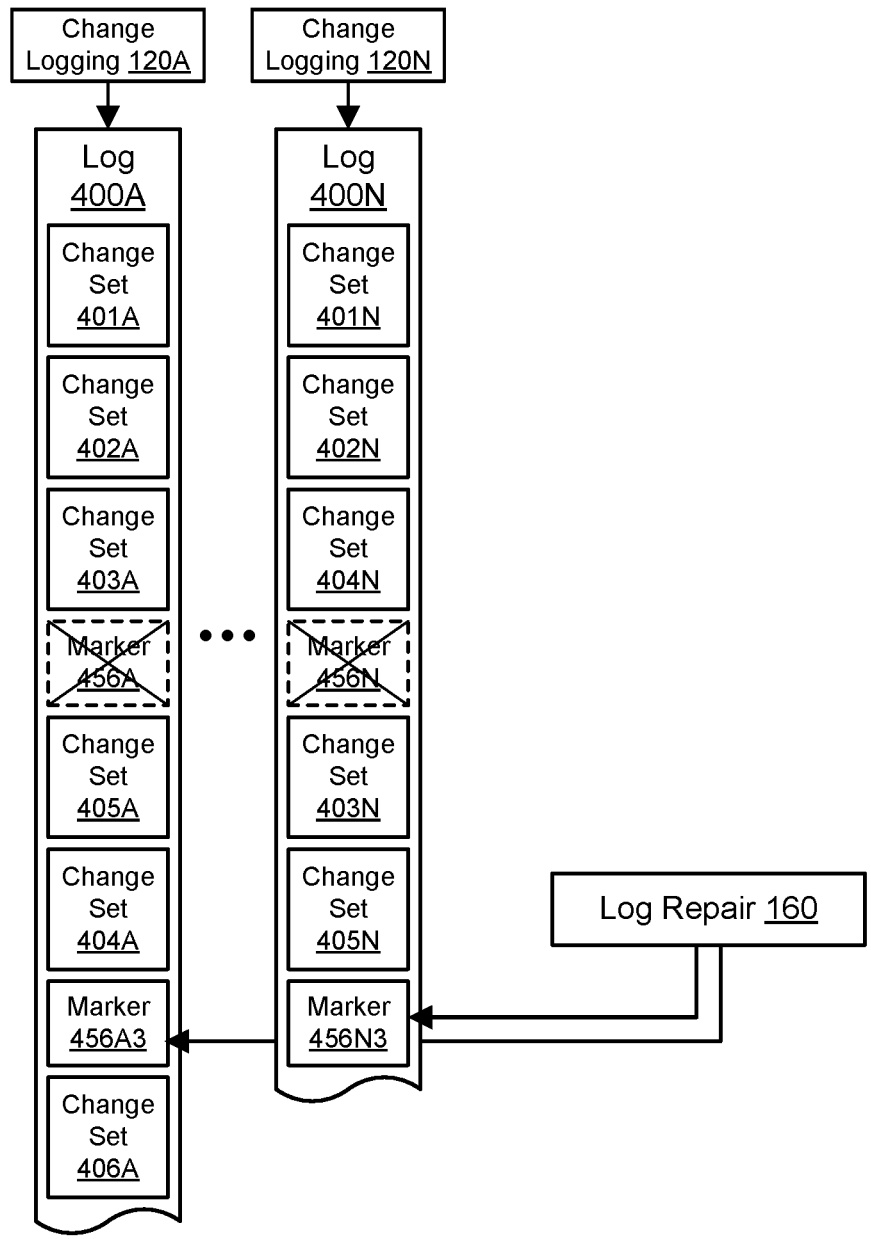

FIG. 4A, FIG. 4B, and FIG. 4C illustrate examples of moving markers to repair archive logs that violated a transactional boundary, according to one embodiment. As shown in FIG. 4A, a log 400A may represent changes to a first partition, and a log 400N may represent changes to a second partition. A sequence of transactions may be represented in both logs by various change sets. For example, a first transaction that affects both partitions may be represented by change set 401A and 401N, a second transaction that affects both partitions may be represented by change set 402A and 402N, a third transaction that affects both partitions may be represented by change set 403A and 403N, a fourth transaction that affects both partitions may be represented by change set 404A and 404N, a fifth transaction that affects both partitions may be represented by change set 405A and 405N, and a sixth transaction that affects only one partition may be represented by change set 406A. As discussed above, a particular change set (such as change set 401A) in log 400A may be associated with a transaction ID, and a different but related change set (such as change set 401N) in log 400N may be associated with the same transaction ID. As shown in FIG. 4A, the order of the transactions may differ between logs 400A and 400N. For example, change set 403N (associated with the third transaction) may be written to log 400N after change set 404N (associated with the fourth transaction), while change set 404A (associated with the fourth transaction) may be written to log 400A after change set 405A (associated with the fifth transaction). The particular change sets in FIG. 4A are shown for purposes of illustration and example, and the logs may include additional change sets before or after the illustrated change sets or fewer change sets than the illustrated change sets.

Using the optimistic marking process 155 discussed above, the position of a marker 456A may be determined in the log 400A between the change set 403A and the change set 405A, and the position of a marker 456N may be determined in the log 400N between the change set 404N and the change set 403N. In the illustrated example, the positions of these markers violate transactional boundaries. For example, the third transaction is represented before the marker in log 400A but after the marker in log 400N, and the fourth transaction is represented before the marker in log 400N but after the marker in log 400A. Accordingly, as shown in FIG. 4B and FIG. 4C, a log repair operation may move the positions of one or more of the markers such that the logs are left in a transactionally consistent state in which transactional boundaries are not violated by the new marker positions. The transaction IDs across different logs 400A-400N may be analyzed using the log repair component 160 to determine whether transactional consistency is violated by the position of one or more markers in the logs.

As shown in FIG. 4B, the log repair 160 may move the markers to an earlier position in the sequence of transactions. In particular, the log repair 160 may place a new marker 456A2 in log 400A after change set 402A, and the log repair may also place a new marker 456N2 in log 400N after change set 402N. In one embodiment, the markers 456A, 456A2, 456N, and 456N2 may represent metadata external to the logs 400A-400N. As a result of these moves, all the components of the first transaction are represented in the logs prior to the new markers, all the components of the second transaction are represented in the logs prior to the new markers, and no partial transactions are represented in either of the logs prior to the new markers.

As shown in FIG. 4C, the log repair 160 may move the markers to a later position in the sequence of transactions. In particular, the log repair 160 may place a new marker 456A3 in log 400A after change set 404A, and the log repair may also place a new marker 456N3 in log 400N after change set 405N. In one embodiment, the markers 456A, 456A3, 456N, and 456N3 may represent metadata external to the logs 400A-400N. As a result of these moves, all the components of the first transaction are represented in the logs prior to the new markers, all the components of the second transaction are represented in the logs prior to the new markers, all the components of the third transaction are represented in the logs prior to the new markers, all the components of the fourth transaction are represented in the logs prior to the new markers, all the components of the fifth transaction are represented in the logs prior to the new markers, and no partial transactions are represented in either of the logs prior to the new markers.

Figure 5:
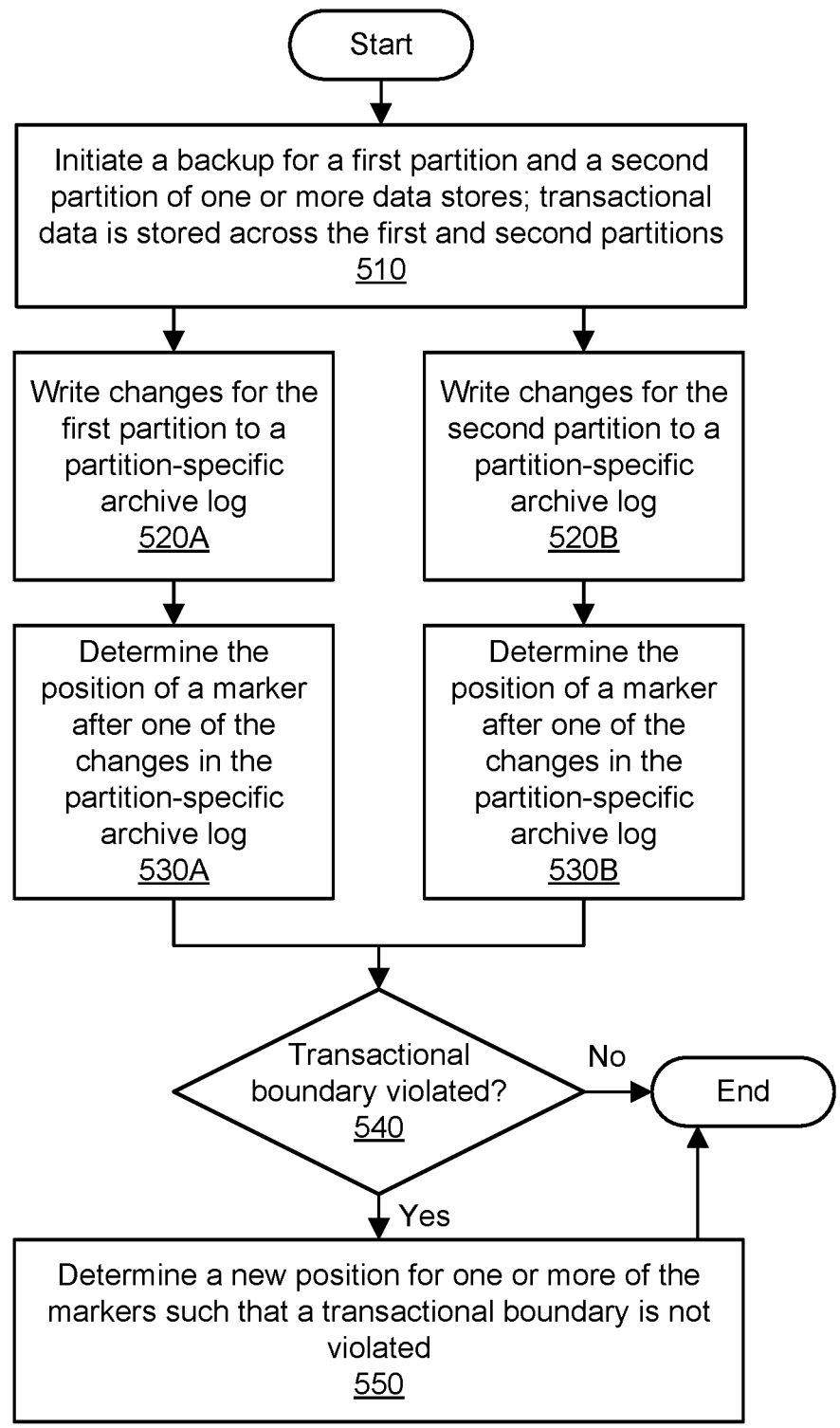
FIG. 5 is a flowchart illustrating a method for transactionally consistent backup of partitioned storage, including optimistic marking of partition-specific logs, according to one embodiment.

FIG. 5 is a flowchart illustrating a method for transactionally consistent backup of partitioned storage, including optimistic marking of partition-specific logs, according to one embodiment. As shown in 510, a backup may be initiated for a data store that includes at least two partitions. Data for one or more transactions may be stored across the two partitions, e.g., such that a particular transaction results in modifications to both partitions. In various embodiments, the backup may be initiated according to a predetermined schedule, by direct input from a user, or in response to a request from another system or service. In various embodiments, an individual backup operation may be performed for all of the partitions of the data store, for a smaller subset of the partitions, or for one partition. In one embodiment, different partitions may be backed up at different times, even as part of the same backup operation. Because partitions may be backed up at different times, transactional consistency may be violated if the backups of the various partitions are restored to the data store. For example, if an inventory data object from an earlier time is restored along with an order processing data object from a later time, or the data objects are restored at different points relative to a sequence of transactions, then the inventory data object may include out-of-date and incorrect data. Additionally, references between the two data objects may be broken if the data objects reflect different backup times or different positions within a sequence of transactions. For at least these reasons, an optimistic marking process may be used during backups in a best effort approach to ensure that restored data is transactionally consistent.

The backup operation may represent a two-phase operation that includes a prepare phase and a commit phase. In the prepare phase, a change logging component may generate and/or update partition-specific logs. As shown in 520A, change data for the first partition may be written to a first partition-specific archive log. As shown in 520B, change data for the second partition may be written to a second partition-specific archive log. The change data may represent additions, deletions, and other modifications. In one embodiment, the change data may represent changes made after a snapshot of the corresponding partition is initiated.

During the commit phase, an optimistic marking process may annotate the archive logs for the first and second partitions by adding markers or by externally storing marker metadata that indicates the positions of markers. As shown in 530A, the position of a marker in the first archive log may be determined; the marker may be positioned after one of the changes in the log to indicate a position of the backup operation relative to a sequence of changes to the partition.

As shown in 530B, the position of a marker in the second archive log may be determined; the marker may be positioned after one of the changes in the log to indicate a position of the backup operation relative to a sequence of changes to the partition. The markers may represent an optimistic approach that transactional consistency has not been violated in the backup of multiple partitions. The optimistic markers may be positioned as if a write outage had been taken during the backup operation. However, the positions of the markers in the logs may indeed violate transactional boundaries with respect to one or more transactions.

As shown in 540, the method may determine whether a transactional boundary has been violated or whether transactional consistency has been violated in the positions of the markers in the two logs. Transactional consistency may include all of the components or none of the components of a transaction being reflected in state of the data store (often across multiple partitions) at a given time, but not only some of the components. For example, an inventory data object and an order processing data object may be involved in a particular transaction, and changes to both data objects should be present in their respective partitions at any given time. At a given time, if one of the data objects includes data associated with the transaction but another one of the data objects does not, then transactional consistency has been violated. The markers may violate transactional consistency if the data store would reflect only a portion (and not all) of a particular transaction upon using the first log to restore the first partition up to the position of its marker and using the second log to restore the second partition up to the position of its marker. Because a given transaction is an all-or-nothing entity, such transactional inconsistency in the data store may result in erroneous data, broken references, and other problems.

If a transactional boundary or transactional consistency was violated, then as shown in 550, a log repair process may be attempted. The log repair process may search backward and/or forward in the logs to find new positions for one or more of the markers. At the new position(s), the markers would not violate transactional boundaries or transactional consistency if the corresponding partitions were restored up to that point. In one embodiment, the scope of the search within a log may be bound by predetermined constraints regarding the number of change sets to examine, a range of time to examine, and so on. The marker for the first log and/or the marker for the second log may be moved to new positions that observe transactional boundaries. The repaired logs may then be used to restore the first and second partitions to a transactionally consistent state.

Figure 6:
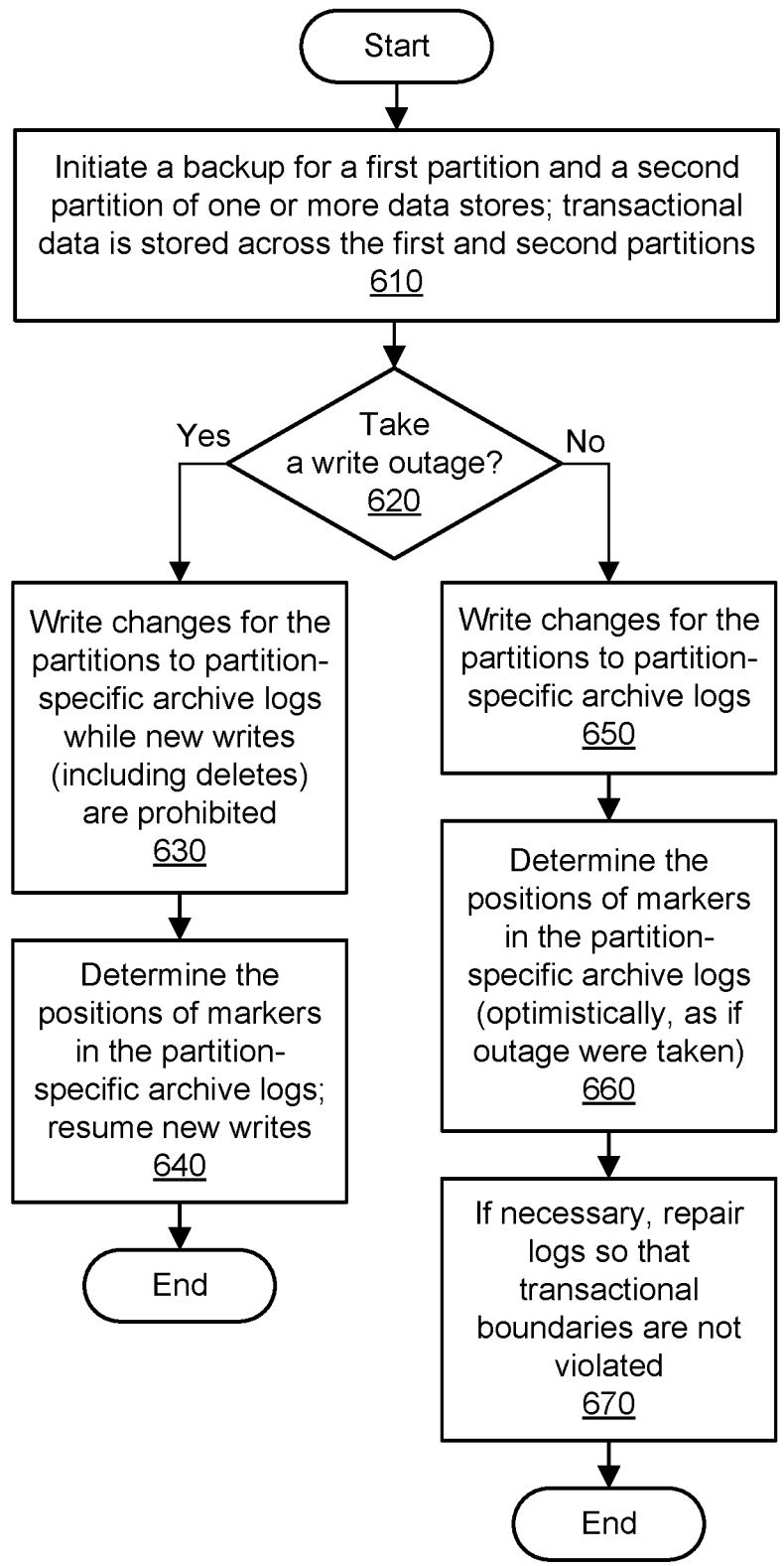
FIG. 6 is a flowchart illustrating a method for transactionally consistent backup of partitioned storage, including selecting between taking a write outage or performing optimistic marking, according to one embodiment.

FIG. 6 is a flowchart illustrating a method for transactionally consistent backup of partitioned storage, including selecting between taking a write outage or performing optimistic marking, according to one embodiment. As shown in 610, a backup may be initiated for a data store that includes at least two partitions. Data for one or more transactions may be stored across the two partitions, e.g., such that a particular transaction results in modifications to both partitions. In various embodiments, the backup may be initiated according to a predetermined schedule, by direct input from a user, or in response to a request from another system or service. In various embodiments, an individual backup operation may be performed for all of the partitions of the data store, for a smaller subset of the partitions, or for one partition. In one embodiment, different partitions may be backed up at different times, even as part of the same backup operation. Because partitions may be backed up at different times, transactional consistency may be violated if the backups of the various partitions are restored to the data store. For example, if an inventory data object from an earlier time is restored along with an order processing data object from a later time, or the data objects are restored at different points relative to a sequence of transactions, then the inventory data object may include out-of-date and incorrect data. Additionally, references between the two data objects may be broken if the data objects reflect different backup times or different positions within a sequence of transactions. For at least these reasons, an optimistic marking process may be used during backups in a best effort approach to ensure that restored data is transactionally consistent.

As shown in 620, the method may determine one of two backup approaches to take. In one approach, as shown in 630 and 640, a write outage may be taken while the backup proceeds. As shown in 630, changes may be written to partition-specific archive logs as discussed above. New write requests or delete requests to the partitions may be delayed or rejected during this time, e.g., while earlier writes are processed and written to the archive logs. Again, a two-phase process may be used with a prepare phase and a commit phase. As shown in 640, during the commit phase, markers may be written to the archive logs. Writes to the partitions may then resume. Although this approach may take portions of the data store offline, the approach may also produce archive logs with markers that are transactionally consistent without needing repair.

In the other approach, as shown in 650, 660, and 670, the data store may be left online while optimistic marking is performed, as discussed above. As shown in 650, in the prepare phase, changes may be written to partition-specific archive logs. As shown in 660, in the commit phase, markers may be written optimistically to the archive logs, as if a write outage were taken. However, the resulting logs may be transactionally inconsistent for the reasons discussed above. Accordingly, as shown in 670, a repair process may be performed (if necessary) to place the logs in a transactionally consistent state by moving one or more markers within the sequence of changes.

In one embodiment, the outage approach shown in 630 and 640 may be selected automatically if the optimistic marking approach fails. The optimistic marking approach may fail, for example, due to high contention on the data store. As another example, the optimistic marking approach may fail if new positions for markers cannot be found (within some constraint on the extent of the search) such that transactional consistency is not violated. As another example, the optimistic marking approach may fail due to a long-running transaction that does not complete in time for the backup. As yet another example, the optimistic marking approach may fail if a user has not budgeted for sufficiently lengthy logs. In one embodiment, the decision shown in 620 may be made based on user input. For example, the user may be asked whether the relevant partitions should be taken offline during the backup operation; if not, then the optimistic marking approach may be selected.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices configured to implement a transactional storage backup system, wherein the transactional storage backup system is configured to:
        initiate a backup operation for a first partition and a backup operation for a second partition, wherein the first partition and the second partition are implemented using one or more data stores, wherein the first partition stores data associated with a plurality of transactions, and wherein the second partition stores data associated with the plurality of transactions;
        determine a position of a first marker in a first archive log associated with the first partition, wherein the first archive log indicates a sequence of changes for the first partition, and wherein the position of the first marker is relative to the sequence of changes for the first partition;
        determine a position of a second marker in a second archive log associated with the second partition, wherein the second archive log indicates a sequence of changes for the second partition, wherein the position of the second marker is expressed relative to the sequence of changes for the second partition, and wherein an order of transactions in the first archive log differs from an order of transactions in the second archive log;
        determine that the first marker and the second marker violate a transactional boundary such that a first set of one or more changes associated with a transaction are indicated before the first marker in the first archive log and a second set of one or more changes associated with the transaction are indicated after the second marker in the second archive log; and
        modify the position of the first marker and the position of the second marker such that a new position of the first marker and a new position of the second marker do not violate the transactional boundary.

2. The system as recited in claim 1, wherein the first marker is moved to the new position earlier in the sequence of changes in the first archive log and the second marker is moved to the new position earlier in the sequence of changes in the second archive log, or wherein the first marker is moved to the new position later in the sequence of changes in the first archive log and the second marker is moved to the new position later in the sequence of changes in the second archive log.

3. The system as recited in claim 1, wherein the first marker and the second marker are moved within a predetermined range relative to the position of the first marker and the position of the second marker.

4. The system as recited in claim 1, wherein the transactional storage backup system is further configured to:

perform a restore operation for the first partition and the second partition, wherein the restore operation is performed using changes in the first archive log up to the new position of the first marker and changes in the second archive log up to the new position of the second marker.

5. A computer-implemented method, comprising:
initiating a backup operation for a first partition and a backup operation for a second partition, wherein the first partition and the second partition store data associated with a plurality of transactions using one or more data stores;
determining a position of a first marker in a first log associated with the first partition, wherein the first log indicates a sequence of changes for the first partition;
determining a position of a second marker in a second log associated with the second partition, wherein the second log indicates a sequence of changes for the second partition;
determining that the first marker or the second marker violates a transactional boundary across the first partition and the second partition; and
modifying the position of the first marker or the position of the second marker such that the first marker and the second marker do not violate the transactional boundary.

6. The method as recited in claim 5, wherein the first marker is moved to a new position earlier in the sequence of changes in the first partition, or wherein the second marker is moved to a new position earlier in the sequence of changes in the second partition.

7. The method as recited in claim 5, wherein the first marker is moved to a new position later in the sequence of changes in the first partition, or wherein the second marker is moved to a new position later in the sequence of changes in the second partition.

8. The method as recited in claim 5, wherein the first marker or the second marker are moved to new positions within a predetermined range before and after the position of the first marker or the position of the second marker.

9. The method as recited in claim 5, wherein, in violating the transactional boundary across the first partition and the second partition, the first marker is positioned before one or more changes associated with a particular transaction in the first log and the second marker is positioned after one or more changes associated with the particular transaction in the second log.

10. The method as recited in claim 5, further comprising:
performing a restore operation for the first partition and the second partition, wherein the restore operation is performed using changes in the first log up to the first marker and changes in the second log up to the second marker.

11. The method as recited in claim 5, wherein the backup operation for the first partition comprises a prepare phase and commit phase, and wherein the first marker and the second marker are positioned in the commit phase.

12. The method as recited in claim 5, further comprising:
initiating an additional backup operation for the first partition and the second partition;
preventing changes to the first partition and the second partition during the additional backup operation;
determining a new position of the first marker in the first log and a new position of the second marker in the second log.

13. A non-transitory, computer-readable storage medium storing program instructions computer-executable to perform:
initiating a backup operation for a first partition and a second partition of one or more data stores, wherein the first partition and the second partition store data associated with a plurality of transactions;
determining a position of a first marker in a first log associated with the first partition, wherein the first log indicates a sequence of changes for the first partition;
determining a position of a second marker in a second log associated with the second partition, wherein the second log indicates a sequence of changes for the second partition, and wherein an order of transactions in the first log differs from an order of transactions in the second log;
determining that the first marker and the second marker violate a transactional boundary across the first partition and the second partition; and
modifying the position of the first marker and the position of the second marker such that the first marker and the second marker do not violate the transactional boundary.

14. The non-transitory, computer-readable storage medium as recited in claim 13, wherein the first marker is moved to a new position earlier in the sequence of changes in the first partition, and wherein the second marker is moved to a new position earlier in the sequence of changes in the second partition.

15. The non-transitory, computer-readable storage medium as recited in claim 13, wherein the first marker is moved to a new position later in the sequence of changes in the first partition, and wherein the second marker is moved to a new position later in the sequence of changes in the second partition.

16. The non-transitory, computer-readable storage medium as recited in claim 13, wherein the first marker and the second marker are moved to new positions within a predetermined range before and after the position of the first marker and the position of the second marker.

17. The non-transitory, computer-readable storage medium as recited in claim 13, wherein, in violating the transactional boundary across the first partition and the second partition, the first marker is positioned before one or more changes associated with a particular transaction in the first log and the second marker is positioned after one or more changes associated with the particular transaction in the second log.

18. The non-transitory, computer-readable storage medium as recited in claim 13, wherein the program instructions are further computer-executable to perform:
performing a restore operation for the first partition and the second partition, wherein the restore operation is performed using changes in the first log up to the first marker and changes in the second log up to the second marker.

19. The non-transitory, computer-readable storage medium as recited in claim 13, wherein the first marker and the second marker are represented using metadata external to the first log and the second log.

20. The non-transitory, computer-readable storage medium as recited in claim 13, wherein the first marker is written to the first log, and wherein the second marker is written to the second log.

* * * * *